Dec. 3, 1968  J. L. MARTIN  3,414,314
BUFFER MEMBER FOR TREE SHAKING DEVICE
Filed March 6, 1967
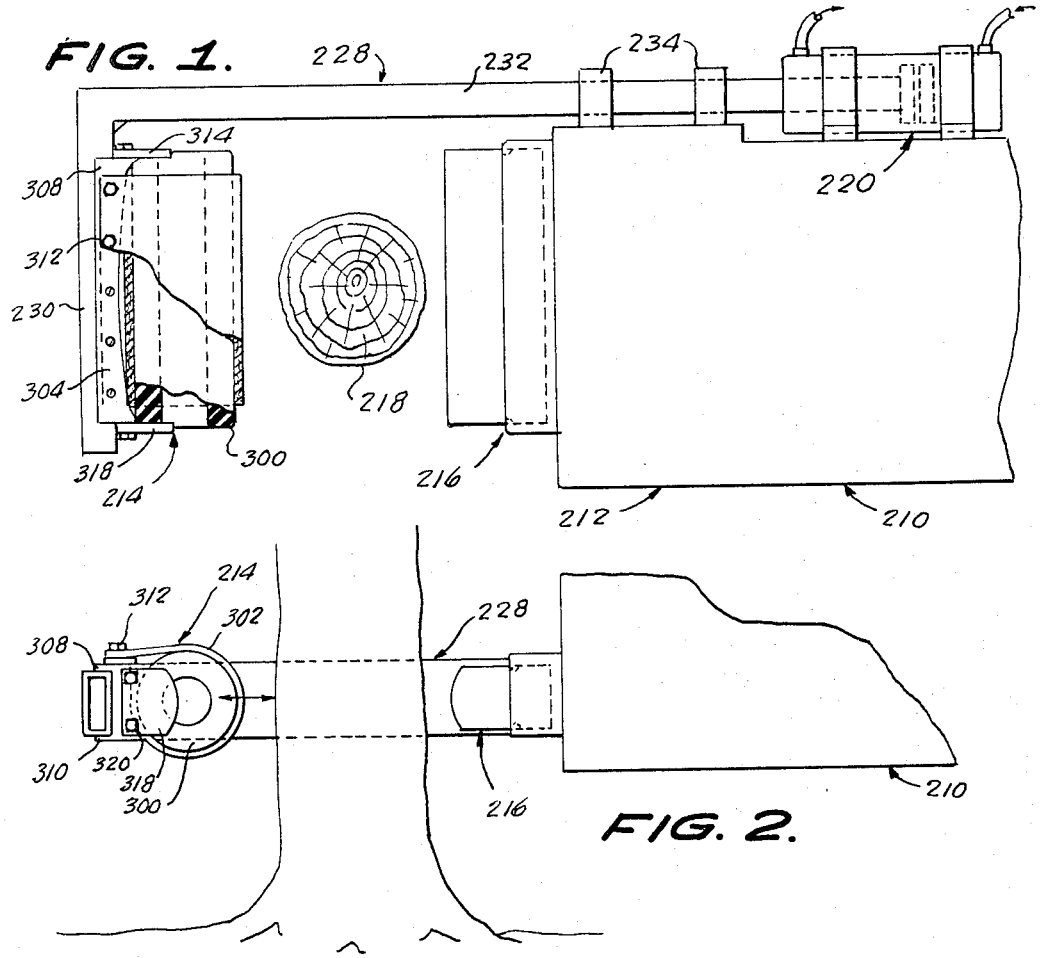
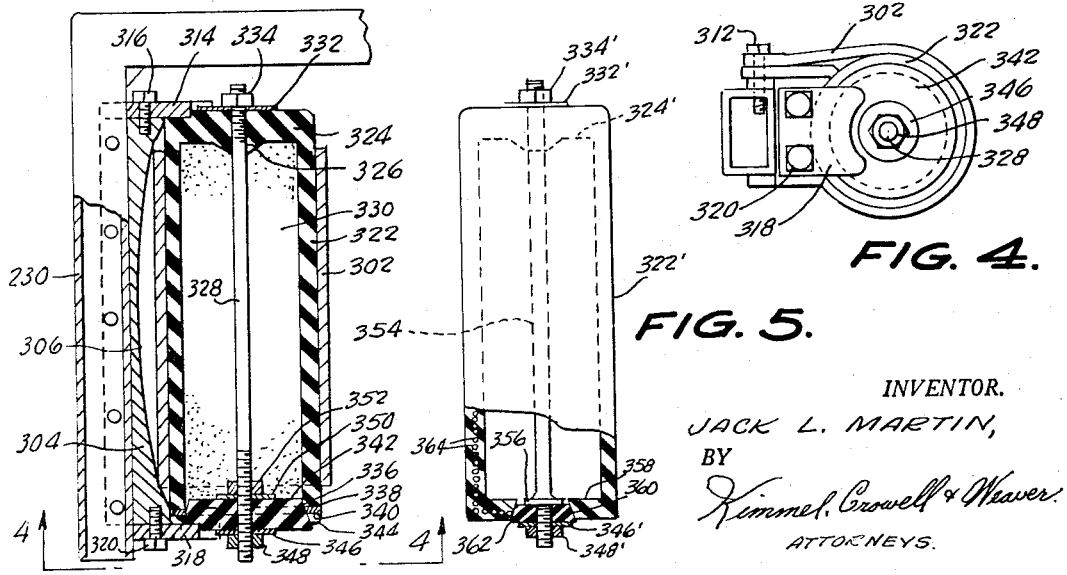
INVENTOR.
JACK L. MARTIN,
BY
Kimmel, Crowell & Weaver
ATTORNEYS.

United States Patent Office 3,414,314
Patented Dec. 3, 1968

3,414,314
BUFFER MEMBER FOR TREE
SHAKING DEVICE
Jack L. Martin, 5144 Western Ave.,
Olivehurst, Calif. 95961
Filed Mar. 6, 1967, Ser. No. 620,809
2 Claims. (Cl. 294—103)

ABSTRACT OF THE DISCLOSURE

A resilient cylindrical container having a removable end closure which is filled with pulverulent material and a bolt extending longitudinally of the cylindrical member for retaining the closure member in place, said resilient cylindrical member forming a buffer member for a tree shaking device is disclosed.

Cross-reference to related applications

The invention described herein constitutes an improvement over my tree shaking device described in application Ser. No. 529,619, filed Feb. 23, 1966, and application Ser. No. 602,350, filed Dec. 16, 1966.

Background of the invention

*Field of the invention.*—This invention relates to nut harvesting devices in general and in particular to devices for shaking nut and fruit trees to cause said nuts and fruits to fall as a step in the harvesting operation.

*Description of the prior art.*—Tree shakers generally of the type described herein are well known in the prior art. Such tree shaking devices are described in my co-pending applications. Generally speaking, the tree shaking devices of the prior art have included cushioning devices or buffering devices for engaging trees to prevent injury to the trees and to transfer a shock wave thereto. Such devices are disclosed in my co-pending applications. Such devices in general, fall into two categories. First, there are cushioning devices which are deformable but non-resilient and, secondly, there are cushion devices which are resiliently deformable. In the first category, containers filled with sand or other pulverulent material may be included. While such devices adequately transfer the shaking energy to the tree, they generally have a comparatively short life. The present invention relates to a cushion device which embodies the advantages of resiliency and those advantages which result from the use of deformable containers filled with pulverulent material.

Summary

The present invention is directed to a buffer member which comprises a resilient cylindrical member filled with pulverulent material such as sand and provided at at least one end with a removable closure. The objects of the invention include:

The provision of a sand filled resilient cylindrical member having a removable closure at one end.

The provision of a resilient container for pulverulent material which has a tapered opening at one end and a groove in the tapered opening provided with a substantially rigid ring to maintain the shape of the cylinder at the openable end thereof.

The provision of a resilient container for pulverulent material which has one end closure integrally formed therewith and an opening in the other end for receiving a resilient closure member.

The specific constructional features and combinational features of the disclosure constitute objects of the present invention.

Brief description of the drawing

FIGURE 1 is a top plan view of the overall shaking device showing the cushion member, in one embodiment, of this invention.

FIGURE 2 is a side elevational view showing the cushion member in position.

FIGURE 3 is a top view in partial cross section showing a modified and highly preferred embodiment of the cushion device of this invention in place in the shaking device.

FIGURE 4 is an end view of the shaking device cushion of FIGURE 3 taken substantially along lines 4—4 in the direction of the arrows as shown in FIGURE 3.

FIGURE 5 is a further modification of the preferred embodiment of the buffer member of this invention.

Description of the preferred embodiments

The overall construction of the shaker jaw generally is adequately described in my co-pending application Ser. No. 529,619, filed Feb. 23, 1966, the disclosure of which is incorporated herein; therefore, the overall shaking device will be described only in general with reference made to the major components thereof. As shown in FIGURE 1, such a tree shaking device 210 has as its major components a movable frame 212, a pair of cushioned jaw means 214 and 216, these jaw means being mounted on frame 212 to form an opening into which a tree 218 may be located. Tree shaker 210 preferably is equipped with an adjustable mounting means 220 for a movable arm 228 carrying a beam 230 which constitutes the other half of the jaw and which supports the cushion means 214. Movable arm 228 includes a shank 232 constrained for linear sliding movement in a guide 234.

With reference now particularly to FIGURES 1 and 2, in one embodiment the tree engaging jaw comprises a resilient cylinder 300 which preferably is supported in a loop 302 of a resilient material as described in my co-pending applications. A backing plate 304 having a centrally concave surface 306 is secured by overlapping lips 308 and 310 by means of bolts 312 to the beam 320. Bolts 312 also secure the flexible suspending means 302.

The buffer member 300 is constrained from movement laterally of the jaw by a pair of end plates 314, secured by bolts 316, and 318, secured by bolts 320.

As best shown in FIGURE 3, the highly preferred embodiment of the cushion member comprises a resilient cylindrical member 322 which is, in a preferred embodiment, provided with an integrally formed closing means 324 at one end, the closing means 324 being apertured as shown at 326 for receiving a bolt 328. As shown in FIGURE 3, the cylindrical container consisting of the cylindrical member 322 and the end closure 324 is substantially filled with the pulverulent material such as sand shown generally at 330. The bolt 328 extends through the body of the sand 330 and is secured at one end by a washer 332 and a nut 334 threadably received upon the threaded end of bolt 328.

In the preferred embodiment thereof, the cylinder 322 is provided at one end with an inwardly tapered opening 336 which is grooved at 338 and receives a substantially rigid metal ring 340 in the groove. An apertured end closure 342 having a tapered edge 344 closes the other end of the cylinder 322. The removable closure 342 is retained in place by an exterior washer 346 and an exterior nut 348 and by an interior washer 350 and an interior nut 352, the latter being provided to prevent excessive inward movement of the closure 342.

An important feature of the invention is the provision of a closure 342 which is resilient but is substantially harder or less resilient than the cylinder 322. This relatively less resilient feature of the closure 342, as compared with the cylinder 322, may be obtained by selecting rubber and rubber compositions of desired hardness according to known principles.

Reference is made now to FIGURE 5, which shows a modified form of the buffer member as shown in FIGURE 4. A bolt 354, which is similar to bolt 328 in most respects, is provided at one end with an integrally formed annular shoulder 356. As is shown in FIGURE 3, the cylindrical member 322' may be provided with an integrally formed closure 324' at one end and the bolt 354 may be retained in position at the one end by conventional washer 332' and the nut 334'. In this embodiment, however, a partially closed end 358 is provided on cylinder 322', the partially closed end forming an inwardly tapered surface at 360 which matingly receives closure member 362 which is also inwardly tapered. Washer 346' and nut 348' may be provided in the conventional manner. It will be noted, however, that the closure 362 abuts against shoulder 356, thereby obviating the need for the additional washer and nut as shown in FIGURE 3.

It will be seen, then, that by the provision of a resilient shape retaining cylinder 322 which is closed at its ends, one end being provided with a removable closure, both the advantages of the pulverulent material filled deformable container and the advantages of the resilient buffer member have been combined to give an unexpectedly effective buffer member. The buffer member, as described, wears substantially longer than the buffer members of the prior art. It is more easily handled since it retains its shape as a result of the resiliency of the material of which the cylinder is made. It is more easily handled and more effectively transmits shaking energy from the shaking device to the tree than the devices of the prior art.

In order to increase the strength of the cylinder 322 and 322', it may be desirable to form into the walls thereof a fiber cord such as nylon cords 364, shown in FIGURE 5, or the equivalent fiber fabric or mesh material.

It will be realized that while the present invention has been disclosed, abstracted and summarized with respect to preferred embodiments, that these embodiments are intended as exemplary of the invention and not in the limiting sense. Accordingly, it is to be understood that the scope of the invention is to be limited only by the scope of the appended claims.

I claim:

1. In a fruit and nut harvesting device of the type having a pair of opposed jaws and buffer means carried on said jaws for resiliently engaging a tree for shaking said tree to dislodge fruit and nuts therefrom, the improvement wherein the buffer means comprises:

an axially elongated cylindrical member formed of a resilient material, said cylindrical member having integrally formed first closing means extending transversely across one end thereof and an opposed inwardly tapering open end;

said first closing means having a centrally located aperture extending transversely therethrough;

second removable closing means for said open end, said second closing means comprising a disk formed of a resilient material having less resiliency than the material of which said cylindrical member is formed, said disk having a tapered peripheral edge for matingly engaging said inwardly tapering open end of said second closing means;

said disk having a centrally located aperture extending transversely therethrough and confronting said aperture formed in said first closing means;

an elongated bolt having a pair of opposed threaded ends;

said bolt extending axially through said cylindrical member and through said apertures with said threaded ends terminating adjacent the exterior sides of said first closing means and said second removable closing means;

a washer mounted on each threaded end of said bolt and engaging the adjacent exterior sides of said first and second closing means;

a securing nut mounted, respectively, on each threaded end of said bolt for engagement against the adjacent one of said washers; and pulverulent material substantially filling said cylindrical member.

2. The invention of claim 1 and a washer mounted on the threaded end of said bolt which extends through said second closing means, said last named washer engaging the inner side of said second closing means; and a nut mounted on said last named threaded end of said bolt to engage said last named washer to clampingly secure said second closing means between its associated internally and exteriorly positioned washers.

References Cited

UNITED STATES PATENTS 3,318,629 5/1967 Brandt _____ 294—103
3,335,556 8/1967 Edgemond _____ 56—328

ANDRES H. NIELSEN, *Primary Examiner.*